United States Patent [19]
Doemen

[11] 3,769,569
[45] Oct. 30, 1973

[54] CONTACTLESS INVERTER CIRCUIT PARTICULARLY TO SUPPLY POLYPHASE A-C MOTORS FROM A D-C SOURCE

[75] Inventor: Benno Doemen, St. Georgen/Schwarzwald, Germany

[73] Assignee: Papst-Motoren KG, Georgen, Germany

[22] Filed: May 19, 1972

[21] Appl. No.: 255,061

[30] Foreign Application Priority Data
May 28, 1971 Germany............... P 21 26 764.1
Mar. 11, 1972 Germany............... P 22 11 873.6

[52] U.S. Cl..................... 321/5, 318/227, 321/18
[51] Int. Cl. ............................................. H02m 7/52
[58] Field of Search ........................... 317/148.5 R; 318/227; 321/5, 45, 46; 323/22 T

[56] References Cited
UNITED STATES PATENTS
| | | | |
|---|---|---|---|
| 3,350,661 | 10/1967 | Bloom et al. ................. | 321/44 X |
| 3,594,623 | 7/1971 | Lamaster ...................... | 318/227 |
| 3,705,342 | 12/1972 | Dalke ........................... | 323/22 T |
| 3,095,534 | 6/1963 | Cockrell ...................... | 321/46 X |
| 3,309,602 | 3/1967 | Euvino et al.................. | 321/46 |
| 3,440,451 | 4/1969 | Honig........................... | 317/148.5 R |
| 3,652,922 | 3/1972 | Healey ......................... | 323/22 T X |

Primary Examiner—William M. Shoop, Jr.
Attorney—Flynn & Frishauf.

[57] ABSTRACT

A clock supplies clock pulses at a predetermined frequency. A group of controlled switching circuits are interconnected between the d-c supply source and the load, typically the windings of a polyphase a-c asynchronous motor. The controllable semiconductor switching circuits are controlled from the clock source to be switched between ON and OFF state to selectively, sequentially energize the windings of the motor. To provide better approach of the pulses to sinusoidal wave shape, a delay circuit is connected between the controlled semiconductor switching circuit to delay the trailing flanks of the pulses passed by the switching circuit upon change from ON to OFF of the semiconductor switches.

16 Claims, 6 Drawing Figures

PATENTED OCT 30 1973　　　　　　　　　3,769,569

CONTACTLESS INVERTER CIRCUIT PARTICULARLY TO SUPPLY POLYPHASE A-C MOTORS FROM A D-C SOURCE

The present invention relates to a contactless inverter circuit and more particularly to such a circuit to provide polyphase alternating current, at any desired phase, from a d-c source to supply a-c motors.

Inverter circuits usually require a-c power at wave shapes which approach sinusoidal wave shape as closely as possible. It has been proposed to so control the output voltage from an inverter that a step curve is provided, formed of a group of components, the step curve then being filtered. This provides a wave shape which, depending on the number and the type of the step stages, and the quality of the filtering, is quite close to an ideal sine wave.

Electronic apparatus which are to be used with automotive vehicles, and other apparatus, frequently require a ventilator to remove excessive heat. Such ventilators are supplied from the battery of the vehicle, thus must operate with a basic d-c source. A d-c motor which uses a commutator is undesirable due to the resulting arcing and the consequent interference. Polyphase motors, when supplied directly from an inverter with square wave output pulses, are not suitable either since the motor operates with high losses and the overall efficiency thereof is poor. Inverter circuits which provide output waves based on a step curve are quite expensive, however, and frequently cannot be used for economic reasons.

It is an object of the present invention to provide an inverter circuit which has an output wave shape which is better suited to be used in electrical a-c equipment, typically polyphase motors, and which is inexpensive to construct and in which bulky and expensive components are avoided. Preferably, the output should be a polyphase output which permits direct drive of a fractional horse power polyphase motor with good overall efficiency.

SUBJECT MATTER OF THE PRESENT INVENTION

Briefly, a clock source or other pulse source is provided which controls a semiconductor switching circuit over a logic circuit, each semiconductor switching circuit having a delay circuit connected thereto which delays the trailing flank of the pulses passed by the semiconductor switching circuit. The delay circuit, which extends the duration of the trailing flank thus provides a pulse, the trailing end of which is gradually decreasing, thus providing better approach to a sinusoidal wave shape than a square wave, resulting in a substantial reduction in harmonics, and being suitable for application to equipment having inductances therein, such as motors.

The delay circuit may be a capacitor connected to a semiconductor switch in the form of a power transistor. The capacitor is interconnected between the input and output of the transistor to delay the OFF switching of the transistor. Using a pair of transistors, that is the power transistor and a control transistor, and interconnecting the capacitor between the output of the power transistor and the input of the control transistor permits substantial reduction in the size of the capacitor, so that, in accordance with this concept of the invention, a small compact unit is provided.

Apparatus in accordance with the present invention may be used particularly with vehicles, and especially with other apparatus in which the power is supplied from a secondary battery, subject to wide swings in output voltage. Delay circuits which are simple and additionally inexpensive have their optimum operating characteristics designed for only a specific certain voltage. It has been proposed to start with a lower voltage, so as to ensure that the inverter will operate also at low basic supply voltage. If then in operation the voltage increases, then a motor connected to the source will consume increasing current, thus changing the delay of the trailing flanks of the pulses. If these pulses become too long, then overlap of the various pulses may occur which, when applied to a motor, means that braking torques will result reducing the efficiency of the motor and, due to the increased current in the motor, substantially increasing the losses therein. Motors connected to such inverter circuits operate asynchronously at speeds which depend on the frequency of supply, for example 4,000 rpm.

In accordance with a feature of the present invention, a semiconductor element, to control the current of the motor, is so connected that the turn-ON time of this element can be delayed, the turn-on delay depending on inductive voltage peaks which are sensed, and which occur in a branch of the inductive load. As the voltage peaks decrease, the delay likewise decreases. The amplitude of the voltage peaks in an inductive load, which arise after the current is turned off, rises with the rise in current which previously was flowing in the inductive load. If the inductive load is a motor, then the amplitude of these voltage peaks additionally depends on loading of the motor, since a motor which provides high power has essentially the characteristics of an ohmic resistance, and has only very little inductance, so that voltage peaks are damped. This characteristic of motors, as loads, is used by utilizing the value of the voltage peaks as a control signal for the desired current limiting. When the voltage peaks increase, then the turn-ON time is delayed, so that less power is supplied to the motor, similar to the type of motor control known as phasing control. Due to the decreased ON time of the connected semiconductor switching element, only a smaller current can build up in the inductance formed of the motor winding. If, however, the motor is heavily loaded, for example upon starting, then the inductive peaks are smaller resulting in a longer ON time. This permits more current to build up in the motor windings, resulting in a higher torque in such a motor. Thus, the motor will start rapidly and will have a tightly proportional supply power-speed characteristic.

The invention will be described by way of example with reference to the accompanying drawings, wherein.

Figure 1:
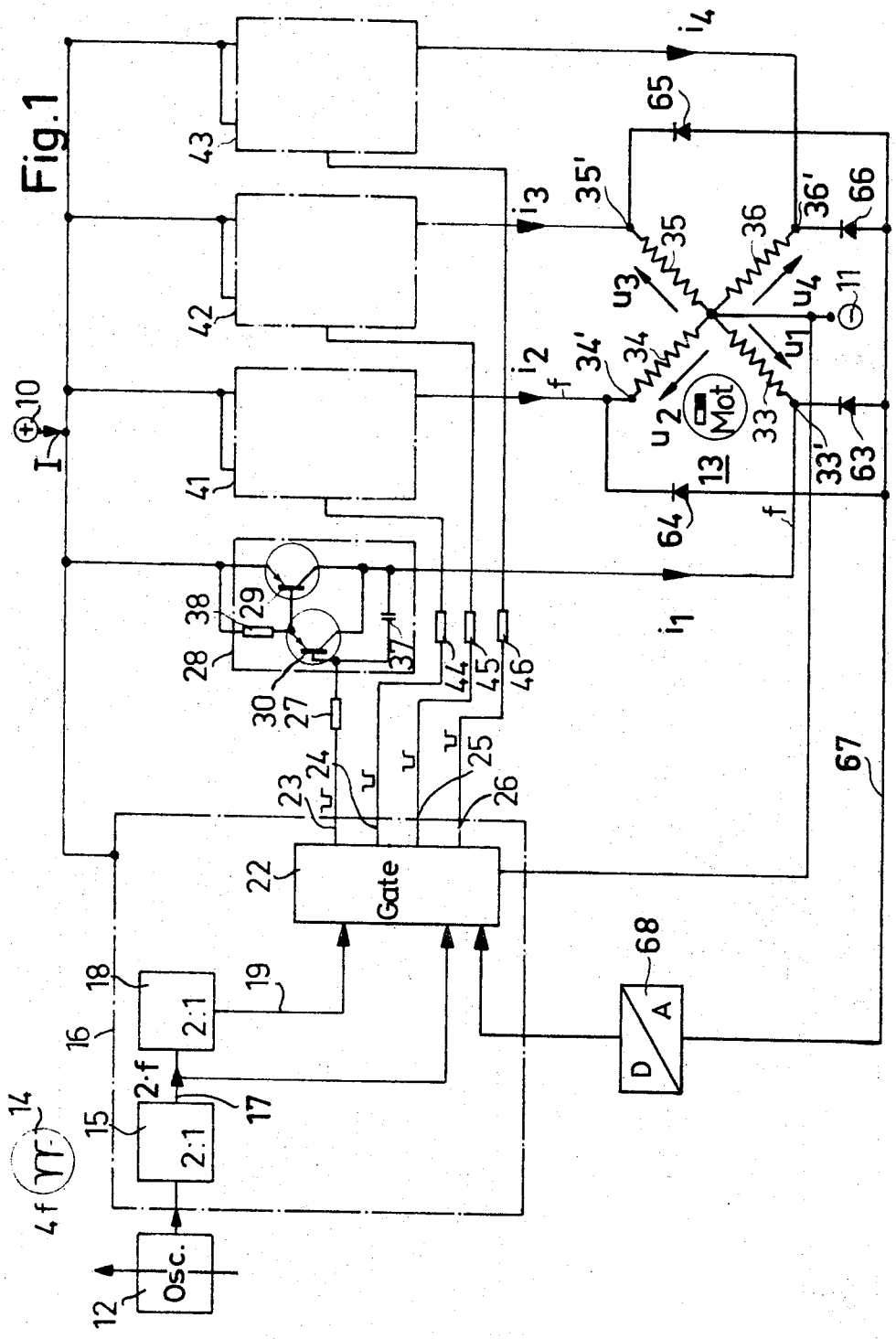
FIG. 1 is a block circuit diagram of the inverter, connected to a motor illustrated as a four-phase motor.

Four-phase current is to be derived from a d-c source schematically indicated as positive and negative terminals 10, 11 of, for example 24 V, to be applied to a motor 13. The output frequency $f$ can be set as desired and may, for example be 400 Hz. It is determined by the frequency of an oscillator 12 which oscillates at four times the nominal output frequency, in the present example 1,600 Hz. The oscillating frequency of oscillator 12 preferably is adjustable so that the speed of the motor 13 can be varied, and set for a desired value.

The output signal of oscillator 12, illustrated in graph 14 (FIG. 5) is applied to a divide-by-two circuit 15 and, in turn, to a divide-by-two circuit 18, both forming part of a logic connecting stage 16. The circuits 15, 18 provide output pulses as indicated by lines 17 and 19, FIG. 5, in the second and third lines thereof. The signal 19 is at the frequency $f$ and has generally square wave characteristics.

The logic circuit 16 includes a logic gate 22 to which the output signals 17 and 19 of the two frequency divider stages 15 and 18 are applied. The logic gate 22 provides four output pulses at its outputs 23, 24, 25, 26, the four output pulses being phase-shifted by 90°, and each having the frequency $f$, as seen in the fourth to seventh line in FIG. 5, indicated as graphs $23'$, $24'$, $25'$, $26'$.

Output 23 is connected over a resistor 27 to the input of a controlled semiconductor switching circuit generally shown at 28. The semiconductor switching circuit 28 has a pnp power transistor 29 and a pnp control transistor 30 therein. The emitter of power transistor 29 is directly connected to positive terminal 10; its base is connected to the emitter of transistor 30 and its collector is connected to the collector of the transistor 30 and with terminal $33'$ of motor winding 33. Motor 13 has four windings 33, 34, 35, and 36, the other ends of the windings being star connected to a common terminal, that is, to the negative terminal 11 of the source.

The collector of transistor 29 is connected over a capacitor 37 to the base of transistor 30, to which, also, the resistor 27 is connected. The base of transistor 29 is additionally connected over resistor 38 with positive terminal 10.

The semiconductor switch 28 controls current $i_1$ through motor winding 33. The currents $i_2$, $i_3$ and $i_4$, flowing through motor windings 34, 35 and 36, respectively, are connected and controlled in similar way by three further semiconductor switching circuits 41, 42, 43, each one being identical to the semiconductor switching circuit 28 above described and connected to the output of gate 22 over respective resistors 44, 45, 46.

The supply voltage between terminals 10 and 11, nominally 24 V, may vary within wide limits. At higher voltages, the currents $i_1$ to $i_4$ may reach undesirable levels. To prevent excessive currents, a limiting circuit is provided which acts on the logic circuit 16 in such a manner that the time duration, or length of the pulses $23'$ to $26'$ (FIG. 5) is so influenced that, as the voltage increases, the pulse duration decreases. This limiting action is not, or hardly effective upon starting, in order to provide high starting torques. To provide such limiting, four diodes 63, 64, 65, 66 have their cathodes connected to the respective ends $33'$ to $36'$ of the windings 33 to 36, and their anodes connected to a common control line 67. Line 67 has voltage peaks applied thereto which occur on the motor windings 33 to 36, and which are connected to logic gate 22 to modify the pulses applied to the switching circuits 28, 41, 42, 43, so that, for certain periods of time, no current will be supplied by the respective switching circuit. The diodes 63 – 66 operate as a disjunctive element, that is, like an OR-gate. Line 67 is connected to the input of an analog-digital converter 68 which processes the signals from line 67 so that they can be accepted by logic gate 22 by converting the signals into ONE or ZERO type signals suitable for handling by the unit 16. The A-D converter is illustrated as a separate element 68; it can be combined with the logic gate 22 or some other apparatus, at little additional cost of components, and has been illustrated as a separate unit in view of the additional function it carries out in the apparatus.

Figure 2:
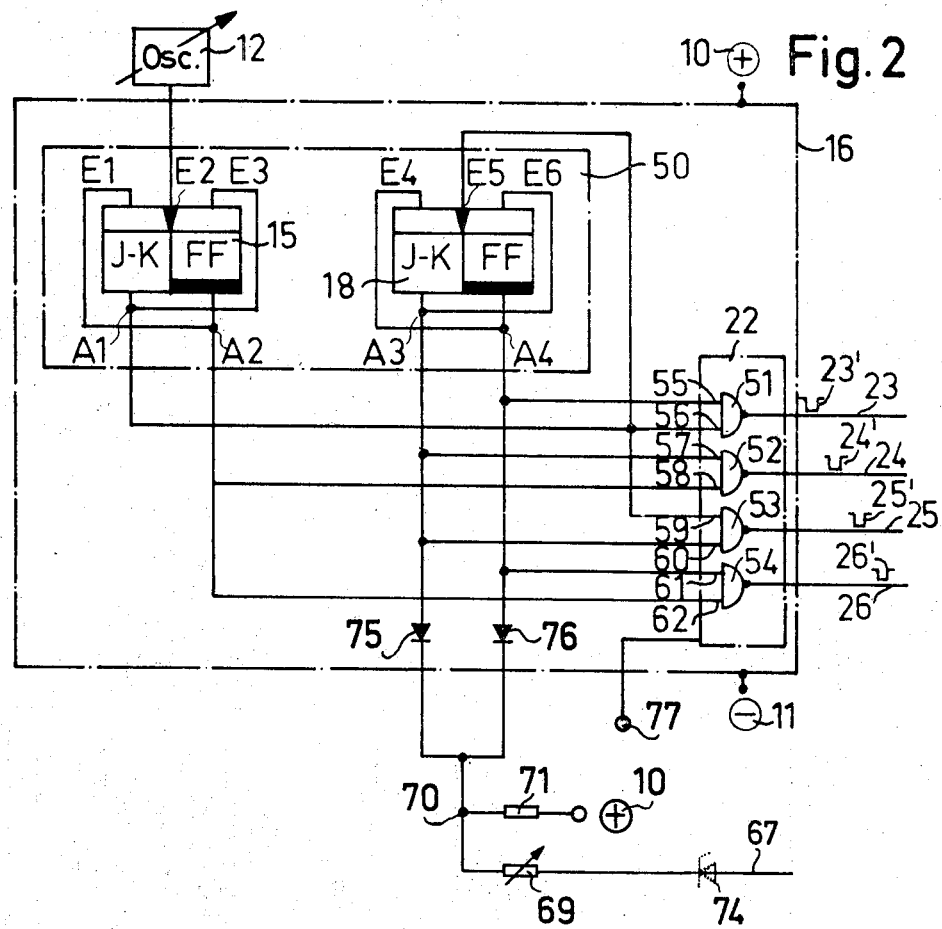
FIG. 2 is a detail of the circuit of FIG. 1.

The logic circuit 16 is illustrated, in one embodiment, in FIG. 2. It is built of two integrated circuits, namely one integrated circuit 50 and a second integrated circuit 22, comprising the logic gate. Integrated circuit 50 has two J-K flip-flops 15 and 18, which operate as frequency dividers. Integrated circuit 22 comprises four NAND-gates 51, 52, 53, 54. In the diagram of FIG. 2, only those inputs of the J-K flip-flops 15, 18, are illustrated which are actually used and connected. The inputs have been given the letters E and the outputs the letters A. Inputs $E_1$, $E_3$ (flip-flop 15) and $E_4$ and $E_6$ (flip-flop 18) are the pre-setting inputs which must have a ONE signal applied thereto so that, upon application of a clock pulse to inputs $E_2$ and $E_5$, respectively, the flip-flops will change state, these latter inputs serving as dynamic triggering of the pre-conditioned or pre-set state. The eight inputs of the NAND-gates 51 to 54 are shown as lines 55 to 62. The output of oscillator 12 is connected to input $E_2$ of flip-flop 15, output $A_1$ is connected to inputs $E_3$, $E_5$ of flip-flop 18 and to inputs 56 and 59 of NAND-gates 51, 53, respectively. Output $A_2$ is connected with input $E_1$ of flip-flop 15 and with lines 58 and 62 connected to NAND-gates 52, 54. Output $A_3$ of flip-flop 18 is connected to input $E_6$ of the same flip-flop and to lines 57 and 60 connected to NAND-gates 52, 53, respectively. Output $A_4$ of flip-flop 18 is connected to its input $E_4$ and lines 55 and 61 of NAND-gates 51, 54, respectively. This logic interconnection provides for 90° shifted sequences $23'$, $24'$, $25'$, $26'$ of signals at the outputs 23, 24, 25, and 26 of the NAND-gates, as shown schematically in FIG. 2 and on the timing diagram of FIG. 5. The pulses are square wave pulses.

Line 67 from the four diodes 63–66 is connected over a resistance 69, which is preferably adjustable, to a junction point 70. A resistor 71 from junction point 70 connects to the positive source of supply 10. Resistor 69 may, for temperature compensation, have a Zener diode 74 connected in advance thereof, if the operating temperatures vary widely. Junction 70 further connects to the cathodes of two diodes 75, 76, the anodes of which are connected to the outputs $A_3$ and $A_4$, respectively, of flip-flop 18. Gate 22 itself is connected to a regulated voltage 77 which, with respect to terminal 10, has a constant voltage of, for example, −5 V.

Figure 5:
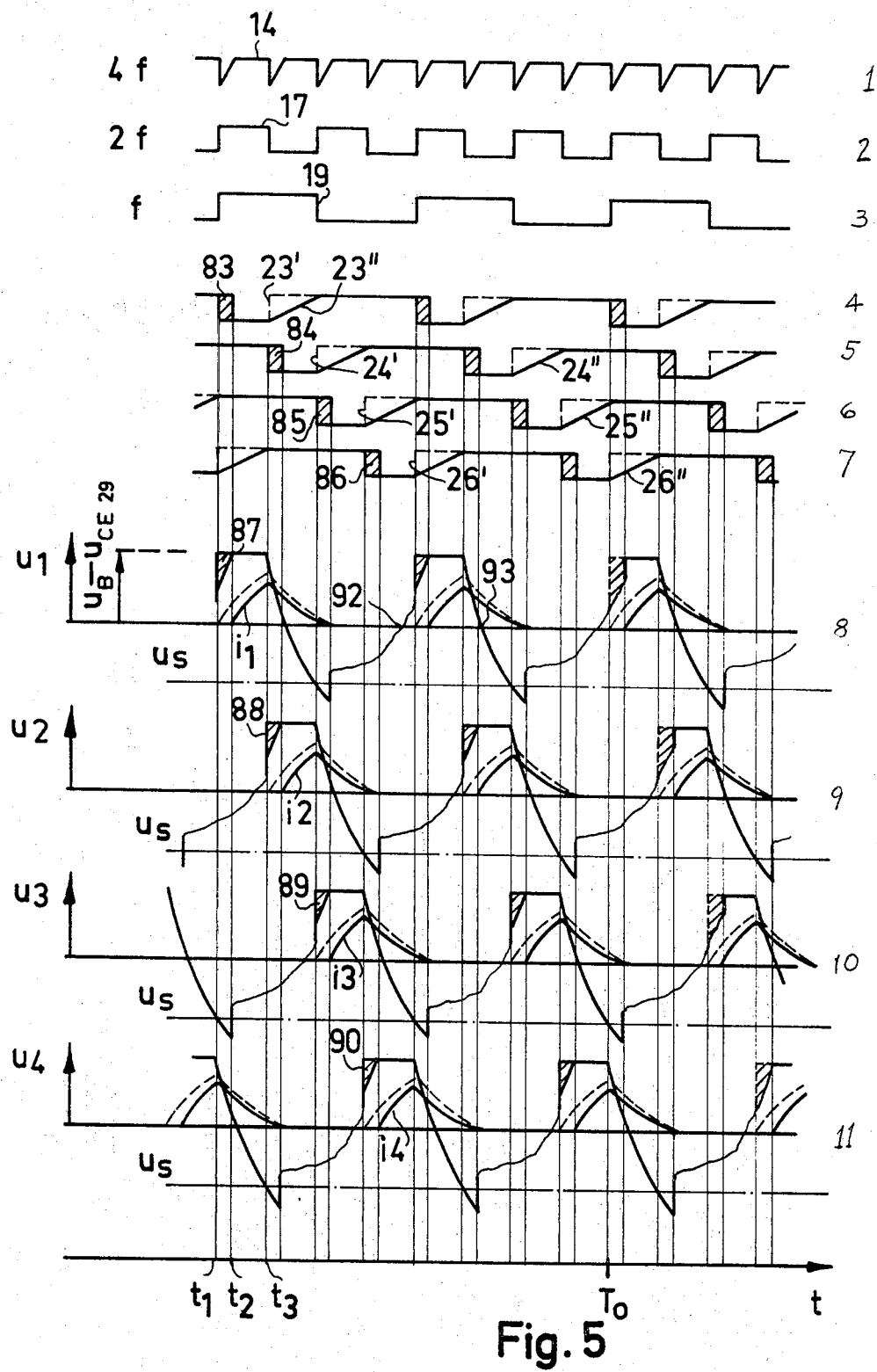
FIG. 5 is a series of graphs to illustrate the operation of the circuit in accordance with FIGS. 1 – 4.

Operation of circuit of FIG. 2: Let it be assumed that the current limiting action is not effective, that is, that motor 13 operates from a source 10, 11 of fairly low voltage. As a square wave pulse $23'$ is applied to the semiconductor switch 28, the previously positive base of transistor 30 becomes negative, and the transistor will conduct, providing control current for transistor 29, which likewise will become conductive, so that its collector voltage will become positive, permitting current to flow through transistor 29 to motor winding 33. At the end of the square wave pulse 23', the output voltage of the NAND-gate 51 changes back in positive direction so that transistor 30 and with it transistor 29 would block. Capacitor 37, however, transfers the resulting negative potential at the collector of transistor 29 to the base of transistor 30 and holds both transistors 29, 30 conductive. The current through transistor 29 decreases gradually, as shown at 23'' in FIG. 5. This means, in other words, that the trailing flank of the current pulse through winding 23 is delayed, as clearly appears in FIG. 5, providing for some overlap with the next pulse sequence 24'. A similar delay, that is, a similar operation will occur with all the other semiconductor switching elements 41, 42, 43; the trailing flanks of the respective current pulses are illustrated in FIG. 5 at 24'', 25'', 26''. The length of the gradually changing delay 23''', 24''', 25''', 26'' will approximately be the same as the length of the associated switching pulses 23' to 26'.

This pulse sequence, with the delayed decrement provides for a substantially uniform rotating field in motor 13. The electrical losses due to harmonics within motor 13 are low and the overall operation of the inverter and motor, from a d-c source, will be efficient and motor 13 will operate quietly and smoothly.

When the voltage between terminals 10 and 11 increases, the speed of motor 13 will remain constant, since the motor speed is determined essentially by the frequency of oscillator 12. Currents $i_1$ to $i_4$ in motor windings 33 to 36 will rise. This causes increased motor losses.

The capacitor 37 in switching circuit 28 (and the respective capacitors in the switching circuits 41, 42 and 43 as well) is designed for a certain operating voltage. If the current rises and the voltage rises, then the trailing extending flanks 23'' to 26'' will become too long. As a result, the overlap of the various phases will increase and braking torques will result, which further increases motor losses. Additionally, the motor noise will increase markedly. To provide for shorter pulses 23' to 26' as the voltage increases, the time period which is cross-hatched in FIG. 5 and illustrated at 83, 84, 85, 86 is taken off from the pulse, so that the pulse duration will be decreased by the cross-hatched time. The width of these cross-hatched areas, that is, the duration of pulse shortening is, in accordance with a feature of the invention, a function of the voltage between terminals 10 and 11.

Figure 6:
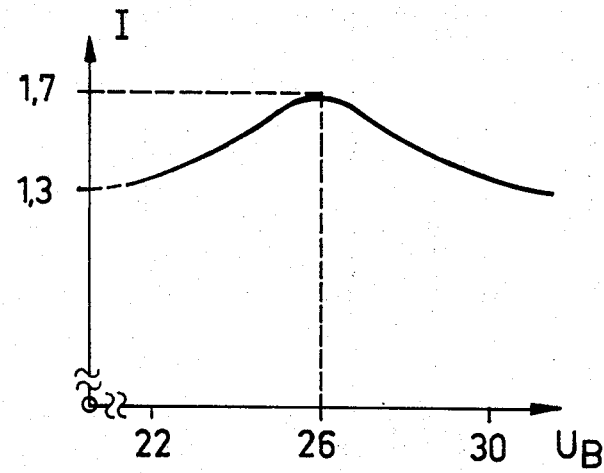
FIG. 6 is a representative graph illustrating current limiting capabilities of the circuit.

As the pulses are shortened, the voltage curves $u_1$ to $u_4$ at the motor windings 33 to 36 cause a delay in voltage rise, illustrated in the graphs of lines 8 to 11 on FIG. 5 at 87 to 90. The duration of this voltage rise delay depends on the amplitude of the operating voltage and increases with increasing voltage, so that the motor currents $i_1$ to $i_4$ do not increase substantially and as rapidly. The entire current I supplied to the motor will have, plotted against motor voltage, approximately the relationship shown in FIG. 6 (which, should be noted, is drawn to a scale not starting at origin zero-zero). The current limiting operation can be readily understood by reference to FIG. 5, particularly lines 8 to 11, in which voltages $u_1$ to $u_4$ on the motor windings 33 to 36 are shown, as well as the resulting currents $i_1$ to $i_4$. The curves of the various voltages and current relationships through the various coils of the motor are identical and an explanation will be given only with respect to one selected one, namely coil 33, for voltages and current $u_1$, and $i_1$.

As the transistor 29 of switching circuit 28 becomes conductive, voltage $u_1$ will rise to the value $u_B - u_{CE\ 29}$. When transistor 29 blocks, the voltage $u_1$ will become negative, following substantially along an exponential function, as illustrated at the portion of the curve shown at 93. The turn-off of transistor 29 is delayed by capacitor 37, as above explained. In the time between the turn-off and renewed turn-on of any one winding, for example winding 33, the remaining windings will have a voltage induced therein by transformer action, as seen at voltage curve portion 92, FIG. 5. The series connected resistors 69, 71 (FIG. 2) will have a current flowing therethrough which increases with higher supply voltage of battery 10, 11, as well as with higher induced voltage (compare curves 92, 93, FIG. 5). This current flow causes junction 70 to become negative with respect to the positive terminal 10 of the battery.

The NAND-gates of the logic circuit 22 sense the voltages at the inputs 55 to 62 as a logical ONE, if they are not more negative than 4 V with respect to battery terminal 10. If the input becomes more negative than 4 V, with respect to source 10, then the associated output, for example 56 to 51 will change to a logical ONE, and the subsequent switching circuit 28 will block. As can be seen, the change into a binary signal requires only the two diodes 75, 76 and the resistors 69, 71, to determine the relationship of the threshold voltage $u_S$ (FIG. 5) to set the delay of turn-on of the semiconductor switching circuit 28, 41, 42, 43. Preferably, the relationship of the conduction of the diodes 75, 76 is made adjustable, by setting of the resistors 69, 71, to adjustably set the threshold voltage. By adjusting the value of the resistors 69, 71, the negative voltage of a given point in the motor winding (for example terminal 33') can be determined, which effects blocking of the switching stage by a voltage at junction 70 (FIG. 2). The limit of this negative voltage is indicated in FIG. 5 as a threshold voltage $u_S$.

The diagram of FIG. 5 is drawn to a time scale, illustrated in the bottom line. At time $t_1$, voltage $u_3$ will have a value which is more negative than the threshold voltage $u_S$. Thus, both diodes 75, 76 will be conductive. This condition will remain until time $t_2$, so that pulse 23' cannot begin at time $t_1$, but rather only at time $t_2$. This decreases the pulse duration of the pulse 23', as seen, by the portion 83, the voltage not starting abruptly but rather rising gradually as indicated at 87 (line 8 of FIG. 5). This decrease in time of application of voltage results in a corresponding reduction of current $i_1$ — see the diagrams on lines 8 to 11. If the induced voltage has a slower rise time than indicated with the first two pulses of the diagram in FIG. 5, then the voltage curve may be of different wave shape, as indicated on the third diagram, lines 8 to 10, and starting at time $T_0$, which shows a different wave shape.

The pulse from the NAND-gate 51, and appearing on line 23, shown at 23', terminates at time $t_3$. Due to the presence of the capacitor 37, this pulse is extended since the transistor 29 does not block suddenly but rather assumes a progressively higher resistance, so that the turn-off pulse will have a gradually decreasing trailing flank, causing some overlap with the subsequent pulse 24', to provide the desired uniform rotating field in motor 13. The other pulses 24', 25', 26' are shortened in a similar manner. As is clearly apparent, it is immaterial if the shortening of the pulse starts exactly at the beginning of the respective pulse, or more towards its middle, since the desired result — current limiting — will occur in either case.

The amplitude of the negative voltage peak depends on the loading of the motor. As the motor is loaded more and more, the voltage peaks decrease. Upon starting, these peaks are also small, since the motor requires more torque output. The motor and the associated circuit therefore automatically control their requirements in accordance with load.

Figure 3:
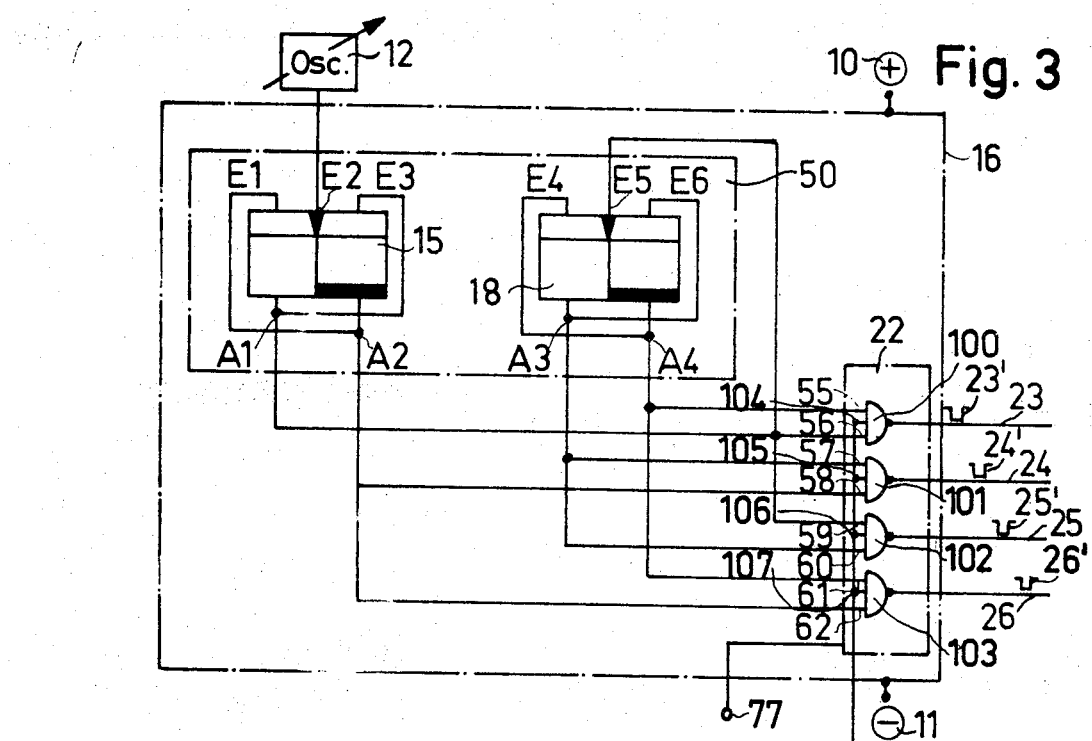
FIG. 3 is another example of a detail of the circuit of FIG. 1.
Figure 4:
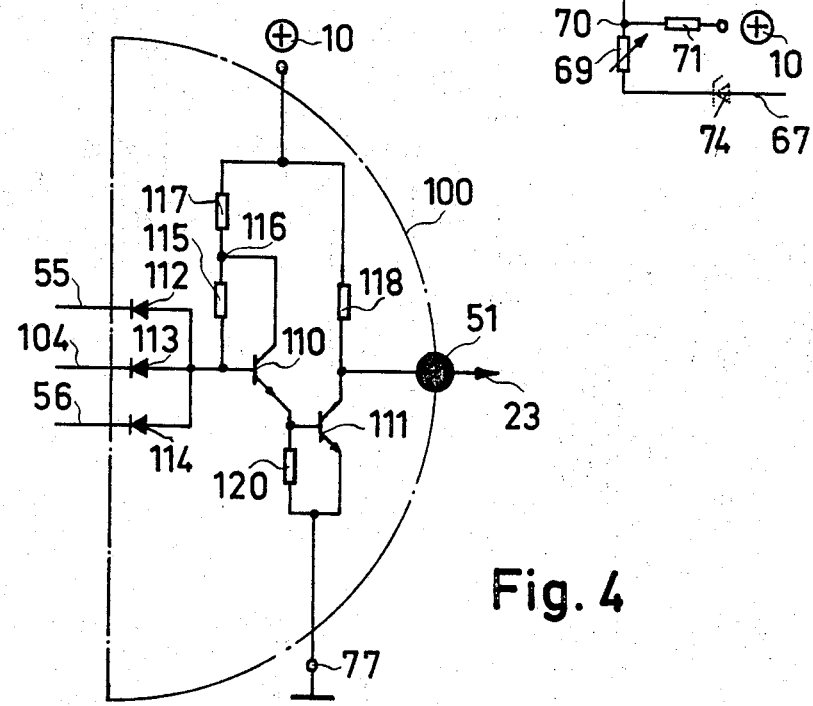
FIG. 4 is a circuit diagram illustrating a suitable AND-gate.

FIGS. 3 and 4 illustrate a modified system of current limiting. Similar parts, operating similarly, have been given the same reference numerals and will not be explained again.

The gate 22 is connected to a terminal 77 which has a constant voltage, for example $-5$ V, with respect to terminal 10. Four NAND-gates 100, 101, 102, 103 are provided, each having three inputs. A detail of such a NAND-gate, for example NAND-gate 100, is illustrated in FIG. 4. Besides the above described inputs 55, 56, a third input 104 is provided. Likewise, the NAND-gates 101 to 103 have a third input 105, 106, 107, respectively, each connected as shown, with junction 70 which is connected in similar manner to that illustrated and described in connection with FIGS. 1 and 2, that is, with line 67 and four diodes 63–66.

The NAND-gate 100 has two npn transistors 110, 111. The base of transistor 110 is connected to the anodes of three diodes 112, 113, 114, the cathodes of which are connected to the input terminals 55, 104, 56, respectively. The base of transistor 110 is further connected to a pair of series connected resistors 115, 117, the junction 116 between which is connected to the collector of transistor 110. The other terminal of resistor 117 connects to terminal 10 which, further, is connected over a resistor 118 to the collector of transistor 111. The emitter of transistor 111 is connected directly to terminal 77; the emitter of transistor 110 is connected to the base of collector 111 and over a resistor 120 to terminal 77, forming the voltage which is negative by a predetermined amount with respect to terminal 10.

Operation: The voltages at all three inputs 55, 104, 56 must be positive by at least 1 V with respect to the voltage of terminal 77 in order that transistor 110 and 111 may conduct, and provide a logic ZERO signal at the output 51. If only one of the three inputs 55, 104 or 56 is less than 1 V positive, or is negative with respect to point 77, no base current can flow in transistor 110 and transistor 111 will remain blocked.

If, for example, at the beginning of pulse 23', a highly negative voltage peak is present, the value of which is greater than the threshold voltage $u_S$, then, even though positive voltage will be available at terminals 55 and 56, transistors 110, 111 will block since input 104 is negative. This permits no output on line 23, and the pulse 23' will be shortened, resulting in the voltage delay 87 of the voltage $u_1$. The other NAND-gates operate in exactly the same manner as above described, and in connection with FIG. 2.

The current can thus be limited by simple, readily available circuits, providing for quiet and smooth motor operation with good efficiency. The additional advantage of limiting the inductive voltage peaks is obtained, thus permitting use of transistors which control the motor current which have only small collector-emitter blocking voltages, and not requiring high-voltage transistors and the resulting expense thereof.

Various changes and modifications may be made within the inventive concept.

I claim:

1. Contactless inverter circuit to obtain a-c power from a d-c source for connection to a polyphase motor (13) forming a load comprising
    a clock source (12) providing clock frequency signals;
    a plurality of controllable semiconductor switching circuits (28, 41, 42, 43) connected between the d-c supply and the respective phases of the motor windings, said controllable semiconductor switching circuit being controllable to switch between ON and OFF state under control of the clock frequency signal;
    and a delay circuit (37) connected in each of the controllable semiconductor switching circuits, and being so dimensioned that the trailing flanks of the pulses (23') provide for overlap of sequential phases of the motor to provide a substantially uniform rotary field in the motor.

2. Circuit according to claim 1, wherein the controllable semiconductor switching circuits (28) comprise, each, a power transistor (29) and the delay circuits comprise, each, a capacitor (37) connected between the input and the output of said power transistor.

3. Circuit according to claim 2, wherein the controllable semiconductor switching circuits further comprise, each, an amplifying transistor (30) having its output connected to the input of the power transistor;
    and the capacitor (37) is connected between the output of the power transistor (29) and the input of the amplifying transistor (30).

4. Circuit according to claim 1, further comprising a logic circuit (16) connected to said clock source, said logic circuit including frequency dividers (15, 18) and a decoding circuit (22) providing sequentially staggered output signals (23', 24', 25', 26') to control the controllable semiconductor switching circuits.

5. Circuit according to claim 4, wherein the motor is a four-phase motor, a pair of frequency divider stages (15, 18) being provided, said decoding circuit being connected and controlled by the frequency divider stages to provide, for each cycle of the a-c power, four control pulses (23', 24', 25', 26'), in equally spaced temporal sequence.

6. Circuit according to claim 1, wherein the motor includes an inductive winding;
    and circuit means controlling the ON duration of the controllable semiconductor switching circuit in dependence on the level of the inductive voltage peaks occurring at a motor winding.

7. Circuit according to claim 6, including threshold sensing means sensing inductive peaks at any one of the motor windings and controlling the ON state of the semiconductor switching circuit if the inductive peaks exceed a predetermined threshold.

8. Circuit according to claim 6, wherein
    OR-gate (63 - 66) means being connected to the windings and having its output connected to control said semiconductor switching circuits in a direction to decrease the ON time of the semiconductor switching circuits connected to the motor windings.

9. Circuit according to claim 8, further comprising logic circuit means interconnected between said clock source and the controllable semiconductor switching circuits, said logic circuit means including conjunctive elements (100, 101, 102, 103), the OR-gate being interconnected with said conjunctive elements.

10. Circuit according to claim 9, wherein the output of the OR-gate is connected to at least one input of each one of said conjunctive elements.

11. Circuit according to claim 9, wherein the conjunctive elements are NAND-gates, at least one input of said NAND-gates having a signal applied thereto derived from said OR-gate.

12. Circuit according to claim 9, including a level setting network (69, 71) interconnected between the OR-gate and the inputs to the conjunctive gates.

13. Circuit according to claim 12, wherein the level setting network (69, 71) provides outputs at levels which are effective to reach the logical signal level of said logic network (16).

14. Polyphase a-c motor and supply circuit to operate the motor from a d-c source comprising
   semiconductor switching circuit means (28, 40, 41, 42) interconnecting the phase windings of the motor and the d-c source of supply;
   means providing essentially square wave pulses connected to and controlling the semiconductor switching circuit means to cyclically control the conduction thereof and thus, cyclically, connect the phase windings of the motor to the source;
   means sensing voltage peaks in excess of a predetermined threshold level across the motor phase windings and obtaining an excess level signal representative of the time duration during which said excess level persists;
   and means controlled by said excess level signal inhibiting application of pulses to said semiconductor switching circuit means while the excess level signal persists.

15. Motor and circuit combination according to claim 14 further comprising delay circuit means connected to said switching circuit means and extending the conduction of said switching circuit means after termination of the essentially square wave pulse.

16. Motor and circuit combination according to claim 14, wherein the switching circuit means comprises transistors and delay circuit means including an interconnection from the output circuit of the transistor to the input circuit thereof to provide gradually declining conduction of the transistor after termination of the essentially square wave pulses.

* * * * *